United States Patent
Goebel et al.

(10) Patent No.: US 6,544,494 B2
(45) Date of Patent: Apr. 8, 2003

(54) REFORMATE PREHEAT OF ATR REACTANTS

(75) Inventors: Steven G. Goebel, Victor, NY (US); Steven D. Burch, Honeoye Falls, NY (US); William Henry Pettit, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 110 days.

(21) Appl. No.: 09/853,400

(22) Filed: May 14, 2001

(65) Prior Publication Data

US 2002/0168316 A1 Nov. 14, 2002

(51) Int. Cl.[7] .............................. C01B 3/24; C01B 3/26
(52) U.S. Cl. .................. 423/650; 252/373; 423/651
(58) Field of Search ..................... 252/373; 423/650, 423/651, 652

(56) References Cited

U.S. PATENT DOCUMENTS

| | | | | |
|---|---|---|---|---|
| 4,927,857 A | * | 5/1990 | McShea et al. ............ 518/703 |
| 5,112,578 A | * | 5/1992 | Murayama et al. ......... 422/197 |
| 5,122,299 A | * | 6/1992 | LeBlanc ..................... 252/376 |
| 6,123,913 A | * | 9/2000 | Clawson et al. ............ 423/652 |
| 6,224,789 B1 | * | 5/2001 | Dybkjaer .................... 252/373 |
| 6,383,468 B1 | * | 5/2002 | Schussler et al. ........... 423/651 |
| 6,413,491 B1 | * | 7/2002 | Aoyama ..................... 423/650 |
| 2002/0007595 A1 | * | 1/2002 | Maier-Roeltgen et al. .... 48/116 |

FOREIGN PATENT DOCUMENTS

WO    WO 98/58874    * 12/1998    ............. C01B/3/38

* cited by examiner

*Primary Examiner*—Stanley S. Silverman
*Assistant Examiner*—Maribel Medina
(74) *Attorney, Agent, or Firm*—Cary W. Brooks

(57) ABSTRACT

Method of operating an autothermal reformer (ATR) to produce a high temperature reformate including preheating steam and air inputs to the ATR with heat from the reformate. The steam is heated by the reformate, and the air is then heated by the steam. There is no direct heat exchange between the reformate and the air. In the heat exchangers effecting the heat transfer, the steam is kept at a higher pressure that both the reformate and the air.

5 Claims, 1 Drawing Sheet

REFORMATE PREHEAT OF ATR REACTANTS

TECHNICAL FIELD

This invention relates to autothermal reformers for converting air, steam and hydrocarbon fuel into a reformate, and more particularly to preheating the air and steam with the reformate exiting the reformer.

BACKGROUND OF THE INVENTION

In fuel cell systems, it is known to use an autothermal reformer (ATR) to react air, steam and a hydrocarbon fuel (e.g. gasoline, methane etc.) to form a reformate containing $H_2$, $CO_2$, $H_2O$, $N_2$ and CO. The CO and $H_2O$ is subsequently converted to $H_2$ and $CO_2$ and the reformate is supplied to the anode side of an $H_2$—$O_2$ fuel cell. In the ATR, a mixture of the hydrocarbon fuel, steam and air pass sequentially through two reaction sections i.e. a first partial oxidation (POX) section, and a second steam reforming (SR) section. In the POX section, the fuel reacts exothermically with a substochiometric amount of air to produce carbon monoxide, hydrogen and lower hydrocarbons (e.g. methane). The hot POX reaction products, along with the steam introduced with the fuel and air, pass into the SR section where the lower hydrocarbons react with the steam to produce a reformate gas comprising principally $CO_2$, CO, $H_2$, $H_2O$ and $N_2$. The SR reaction is endothermic and obtains its required heat from the heat generated by the exothermic POX reaction that is carried forward into the SR section by the POX section effluent.

SUMMARY OF THE INVENTION

It has been determined that the reformate exiting the SR section must have a temperature of at least about 650° C. (preferably about 700° C. to about 750° C.) in order to suppress methane formation and thereby increase hydrogen production. One way of achieving such high reformate temperatures is to preheat the air and steam inputs to the ATR. Preheating not only adds needed heat to the system, but permits minimizing the amount of air that is needed which, in turn, increases system efficiency. The present invention provides improved system dynamic response by more closely coupling the heat needs of the ATR input flow (air and steam) with the heat in the ATR output flow (reformate), rather than relying on heat from a separate combustor located at the end of the system. Hence, in accordance with the present invention, such steam/air preheating is effected by heating the steam and air input streams to the ATR with heat extracted from the reformate exiting the SR section of the ATR. The steam is used as an intermediate heat carrier fluid such that reformate is used to heat the air (and steam) without the potential for the reformate and air mixing and reacting (i.e. should a leak develop within the heat exchanger) which could cause deterioration of the heat exchange incident to a localized heating of the heat exchange at the leak/reaction site. More specifically, the present invention contemplates a method of operating an autothermal reformer that converts steam, air and hydrocarbon fuel to produce a gaseous reformate having a first pressure and a temperature of at least about 650° C. The method comprises preheating the steam and air with heat extracted from the reformate by first passing the steam and reformate into a first heat exchanger that transfers heat from the reformate to the steam which is maintained at a second pressure greater than a first (i.e. reformate) pressure so that if a leak occurs in the first heat exchanger the steam will flow toward the reformate. Thereafter, the steam is fed into a second heat exchanger that transfers heat from the steam to air flowing through the opposite side of the heat exchanger. The air in the second heat exchanger is maintained at a third pressure that is less than the second (i.e. steam) pressure, so that if the second heat exchanger leaks, the steam will flow toward the air-side of the heat exchanger. The net effect of this arrangement is that heat is transferred from the reformate to the input air via the input steam without having the reformate in direct heat exchange relationship with air across the wall of a heat exchanger. According to a preferred embodiment of the present invention, a third heat exchanger is provided between the ATR and the first heat exchanger to reheat the steam after it has given up some of its heat to the input air. In one embodiment of the invention, the first and third heat exchangers are contained in a common housing. In another embodiment, the first and second heat exchangers are contained within a common housing. In the most preferred embodiment, all three heat exchange processes are effected within a common housing to reduce start-up time and to minimize heat loss as well as heat exchanger volume, mass and cost.

DESCRIPTION OF THE PREFERRED EMBODIMENT

The invention will better be understood when considered in the light of the following detailed description of certain specific embodiments thereof which is given hereafter in conjunction with the aforesaid Figures.

Figure 1:
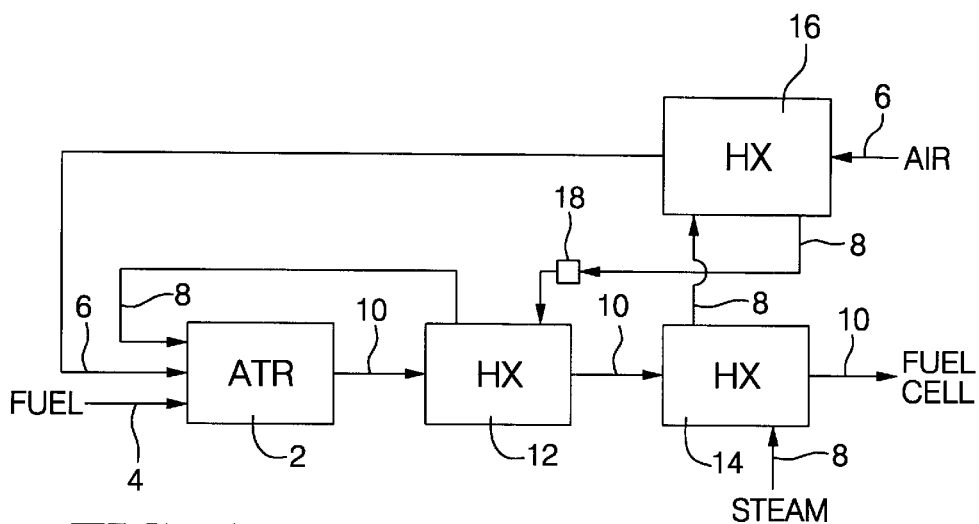
FIG. 1 is a schematic representation of one embodiment of an autothermal reformer, and associated heat exchangers, suitable for effecting the method of the present invention.

FIG. 1 schematically depicts one embodiment of an ATR-heat exchanger arrangement for effecting the process of the present invention. More specifically, FIG. 1 shows an autothermal reformer 2 (ATR) being supplied with a hydrocarbon fuel (e.g. gasoline or methane) 4, air 6 and steam 8. The fuel, steam and air react in the ATR to form a hot (i.e. at least about 650° C.) reformate gas 10 comprising principally $H_2$, $CO_2$, CO, $H_2O$ and $N_2$. The reformate 10 passes through a heat exchanger 12 where some of its heat is transferred to the steam 8 inputted to the ATR 2 The reformate 10 exiting the heat exchanger 12 passes into another heat exchanger 14 wherein more heat is transferred from the reformate 10 to the steam 8 entering the heat exchanger 14. A cooler reformate 10 exits the heat exchanger 14, and is purified (i.e. has the CO substantially removed by water-gas-shift and preferential oxidation reactions) on its way to the anode of a fuel cell (not shown). The steam 8 exiting the heat exchanger 14 enters still another heat exchanger 16 where its gives up some of its heat to air 6 passing through the other side of the heat exchanger 16 thus preheating the air 6 before it enters the ATR 2. Steam 8 exiting the heat exchanger 16 passes through heat exchanger 12 where it is heated by the reformate exiting the ATR to preheat the steam before it is inputted to the ATR 2. Preferably the flows in all of the heat exchangers (12, 14, 16) are countercurrent to provide the maximum heat transfer effectiveness. The steam 8 is at higher pressure than either the reformate 10 or air 6, and the air 6 is at a high pressure than the reformate 10. Since the steam 8 must flow through heat exchanger 12 before combining with air 6 at a common pressure in the ATR 2, the pressure drop incurred by the steam 8 in heat exchanger 12 will ensure that steam 8 is at a higher pressure than the air 6 in heat exchanger 16. To further ensure that steam 8 is at a higher pressure than both air 6 and reformate 10, a pressure regulator, or flow restrictor, 18 is provided in the steam line 8, after the heat exchanger 16, so that, if a leak were to occur in any of the heat exchangers, the steam would always flow into the adjacent fluid (rather than vice versa) and thereby preclude any mixing of the air and the reformate which could cause damage to the applicable heat exchanger and possibly fuel cell system components (e.g. water-gas-shift reactors) downstream of the leak.

Figure 2:
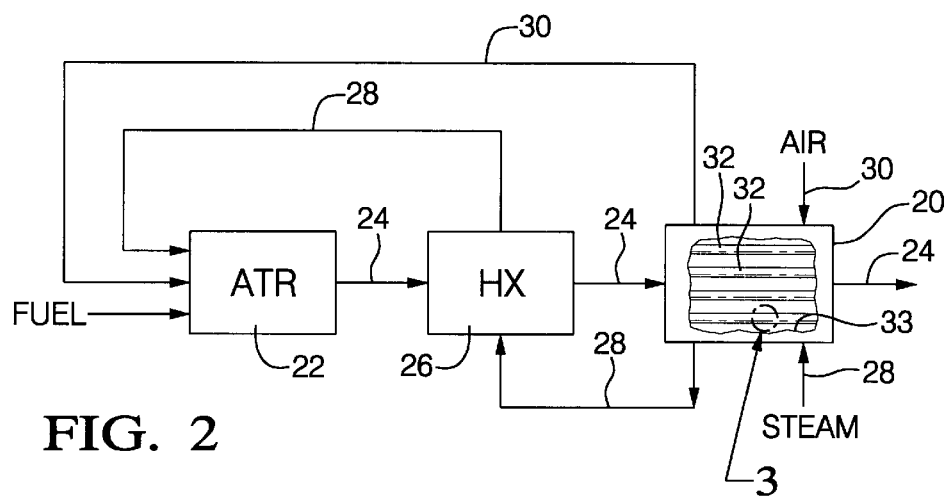
FIG. 2 is a schematic representation of a preferred embodiment of an autothermal reformer, and associated heat exchangers, suitable for effecting the method of the present invention.
Figure 3:
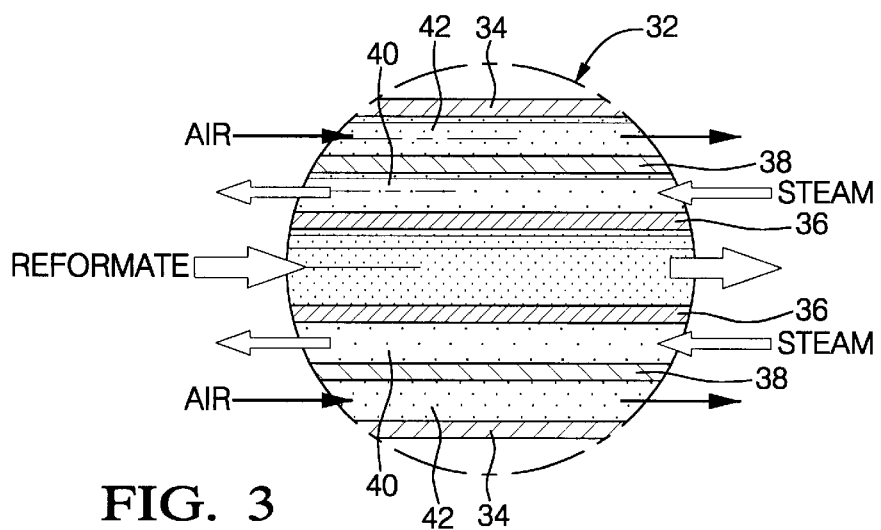
FIG. 3 is an enlarged, sectioned view of one of the concentric heat transfer tubes 32 of the heat exchanger of FIG. 2.

In one embodiment of the invention, the first and third heat exchangers 12 are contained in a common housing. Bar-and-plate or shell-and-tube heat exchanger cores, inter alia, are effective for this purpose. In the preferred embodiment shown in FIG. 2, the heat exchange processes effected in heat exchangers 14 and 16 (see FIG. 1) are combined into a single unit 20 to minimize heat loss, heat exchanger volume, mass and cost, and to reduce start-up time. Steam is always between the air and reformate. In this embodiment, the ATR 22 produces a hot reformate stream 24 which exits the reformate-to-steam heat exchanger 26, and enters the three-fluid heat exchanger 20 where it gives up some of its heat to steam 28 also passing through the heat exchanger 20. Air 30 is concurrently inputted to the threefluid heat exchanger 20 where it is heated by the steam 28 passing therethrough. A concentric-tube, tube-and-shell heat exchanger is particularly useful for this application. Such a heat exchanger comprises a plurality of concentric tubes 32 within a common housing 33, and comprises an outer tube 38 encircling an inner tube 36 (see FIG. 3). Air flows through the inner tube 36, steam flows through the annulus 40 between the inner tube 36 and the outer tube 38, while reformate flows over the plurality of concentric tubes 32 within housing 33. Alternatively, reformate could flow through the center tube 36 and air flows over the plurality of concentric tubes 32 within housing 33. Fins could be provided on tubes 36 and 38 to enhance heat transfer and a bellows-type shell could be used to accommodate thermal expansion of the shell. In a most preferred embodiment the heat exchange processes effected in heat exchanger 12, 14 & 16 of FIG. 1, are combined into a single multi-fluid heat exchanger (not shown).

While the invention has been disclosed in terms of certain specific embodiments thereof, it is not intended to be limited thereto, but rather only to the extent set forth hereafter in the claims which follow,

What is claimed is:

1. Method of operating an autothermal reformer for converting a mixture of steam, air and hydrocarbon fuel into a gaseous reformate having a first pressure and a temperature of at least about 650° C., said method comprising preheating said steam and air with heat extracted from said reformate by (a) passing said steam and said reformate into a first heat exchanger for transferring heat from said reformate to said steam and in which said steam is maintained at a second pressure greater than said first pressure, and (b) passing said air and said steam into a second heat exchanger for transferring heat from said steam to said air and in which said air is maintained at a pressure less than said second pressure, whereby heat is transferred from said reformate to said air via said steam without having said reformate in direct heat exchange relationship with said air.

2. A method according to claim 1 wherein said first and said second heat transfers are effected within a common housing.

3. A method according to claim 1 including said steam exiting said second heat exchanger into a third heat exchanger for again transferring heat from said reformate to said steam after said steam has been cooled in said second heat exchanger.

4. A method according to claim 3 wherein said first and said third heat transfers are effected within a common housing.

5. A method according to claim 3 wherein said first, second and third heat transfers are effected within a common housing.

* * * * *